United States Patent [19]
Pun

[11] 3,895,425
[45] July 22, 1975

[54] COIL FORMING APPARATUS AND METHOD

[76] Inventor: John Y. Pun, 10601 San Pablo Ave., El Cerrito, Calif. 94530

[22] Filed: Jan. 8, 1974

[21] Appl. No.: 431,666

Related U.S. Application Data
[62] Division of Ser. No. 239,655, March 30, 1972, Pat. No. 3,786,353.

[52] U.S. Cl. ................ 29/205 D; 29/59 B; 29/605
[51] Int. Cl. ... H02k 15/04; H02k 15/00; H01f 7/06
[58] Field of Search ...... 29/205 D, 205 R, 596, 605, 29/606

[56] References Cited
UNITED STATES PATENTS
| | | | |
|---|---|---|---|
| 3,579,788 | 5/1971 | Fritzsche | 29/205 D |
| 3,579,791 | 5/1971 | Arnold | 29/205 D |
| 3,628,238 | 12/1971 | Hill | 29/596 |

*Primary Examiner*—Thomas H. Eager
*Attorney, Agent, or Firm*—Flehr, Hohbach, Test, Albritton & Herbert

[57] ABSTRACT

A contour molded galvo-motor coil together with the forming apparatus and the specific method of manufacture. A low inertia coil is formed which also allows a smaller air gap in the magnetic circuit of the galvo-motor. The associated improvement in galvo-motor efficiency results from the inverse square relationship between flux density and length of air gap. The formed coil is shaped as a section of a thin walled circular cylinder and impregnated with a compound during winding which when cured provides a rigid unitized coil structure. The low mass resulting from the absence of the conventional coil form and the high rigidity afforded by the coil shape and impregnation conpound eliminate torsional deformation during operation and provide a galvo-motor having high efficiency and accuracy.

5 Claims, 6 Drawing Figures

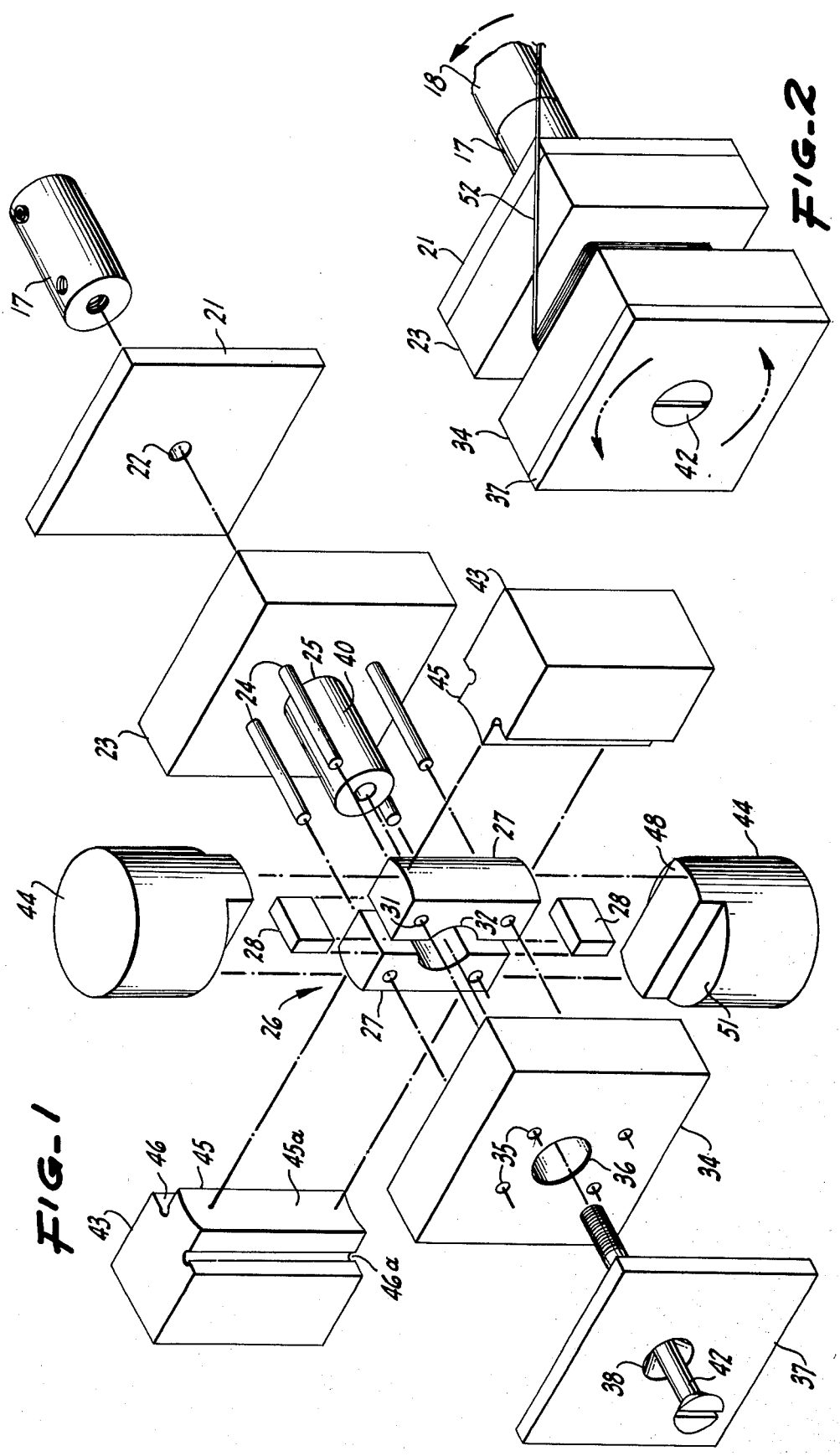

COIL FORMING APPARATUS AND METHOD

This is a division, of application Ser. No. 239,655 filed Mar. 30, 1972, now U.S. Pat. No. 3,786,353, issued Jan. 15, 1974.

THE BACKGROUND OF THE INVENTION

This invention relates to galvo-motor coils and to method and apparatus for manufacturing the same in a particular form.

In the past such coils have been manufactured using non-magnetic metal channels as coil forms onto which electrical conducting wire was wound. The channel became the structural support for the wound coil and therefore was an integral part of the coil itself. When an electric current flowed through the coil causing it to move within the magnetic field of the galvo-motor, the coil was required to work against added inertia of channel. Furthermore, the magnetic gap between the core and pole pieces of the galvo motor has to be sufficiently wide to allow space for the channel, rectangular in cross section, to move freely through a rotational path. The wire wound channel also produced unpredictable coil thickness from one coil to the next. To accomodate the tolerance in coil thickness the magnetic gap was further extended. Uniformity in performance from one galvo-motor to the next was therefore achieved through a sacrifice of magnetic efficiency.

To resist torsional deformity about the coil axis of rotation a metal channel was required to be of a minimum thickness. This thickness requirement not only increased the length of the magnetic gap leading to inefficiency, but also reduced the frequency response of the galvo-motor for a given size magnet and given amount of electrical power consumed due to the greater resulting mass of the coil. Greater power consumption at times required an increase in the size of the coil wire used, resulting in further addition of coil mass. This also lowered the potential frequency response characteristics of the galvo-motor coil of the lowest possible mass and the highest torsional rigidity providing at the same time maximum efficiency due to its geometric configuration.

SUMMARY OF THE INVENTION AND OBJECTS

The contour molded coil of the present invention as produced by utilizing special forming apparatus described herein provides a low-mass, ideally shaped galvo-motor coil with a high torsional rigidity. The structural strength is derived from the cured impregnation compound and the thin walled circularly cylindrical shape molded into the sides. The coil sides are maintained at a uniform thickness from coil to coil by the exact spacing designed into the coil winding forms and the curving mold forms, which together make up a unitary wiring assembly or jig. The coil end turns are properly shaped to receive pivots mounted on the center line of the cylinder of which the coil sides are wall sections.

The impregnation compound is applied to the electrical conductor as it is wound onto the coil form and will be present in excess amount prior to the assembly of the coil side forms and and turn forms. The final forming assembly allows escape of excess impregnation compound as the side and end mold forms are forced by pressure into their final positions. Curing of the impregnation compound within the coil in its final formed configuration takes place in the forming apparatus assembly. Those members of the forming apparatus which are in contact with the coil and subsequently with the impregnation compound are made of a material which resists adhesion of the compound to their surfaces. At the completion of the cure cycle, the forming apparatus assembly may be disassembled readily without injury to the formed coil and without requiring cleaning of the forming apparatus prior to its next use.

The method involved in forming the coil on the coil form includes wetting the electrical conductor with the impregnation compound prior to presenting it to the coil form to be rotated on a winding machine. The process includes bringing out both ends of each strand of conductor laid down on the coil form during the winding process for subsequent electrical connection. The application of the exterior forming members involves pressing them into place and thereby exuding excess impregnation material and attaining the desired coil shape in the uncured condition. Curing takes place in accordance with the characteristics of the compound applied to the conductor during the winding steps.

In general it is an object of the present invention to provide a coil forming apparatus, method which will overcome the above limitations and disadvantages.

Another object of the invention is to provide a forming apparatus of a galvo-motor coil which will faithfully reproduce mechanical and electrical characteristics for a large number of coils.

Another object of the invention is to provide a method and apparatus for a forming galvo-motor coil upon which the coil is initially wound, finally formed and cured without the necessity for in-process removal and the consequent possibility of coil deformation or damage.

Another object of the invention is to provide a method of manufacture for a contour molded galvo-motor coil of relatively few simple steps which minimizes the possibility of variation in mechanical and electrical characteristics of the coil.

A BRIEF DESCRIPTION OF THE DRAWINGS

FIG. 1 is an exploded view of the coil forming apparatus including the final forming components.

FIG. 2 is an isometric view of the apparatus for winding and initial forming of a coil.

DESCRIPTION OF THE PREFERRED EMBODIMENT

Figure 3:
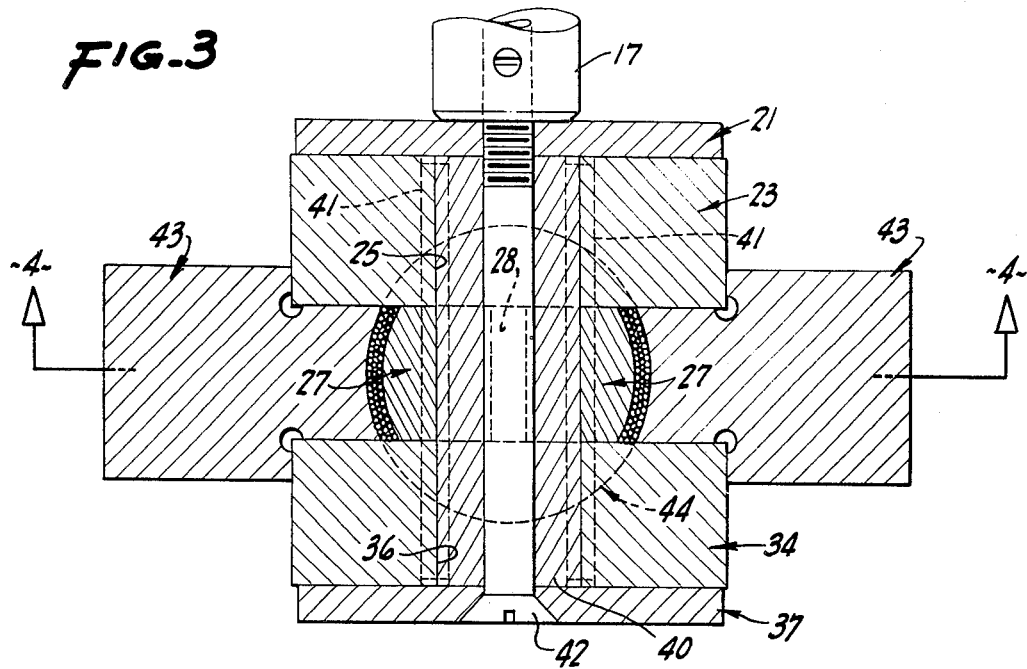
FIG. 3 is a side elevational view of the final forming assembly taken along the line 3—3 of FIG. 4.
Figure 4:
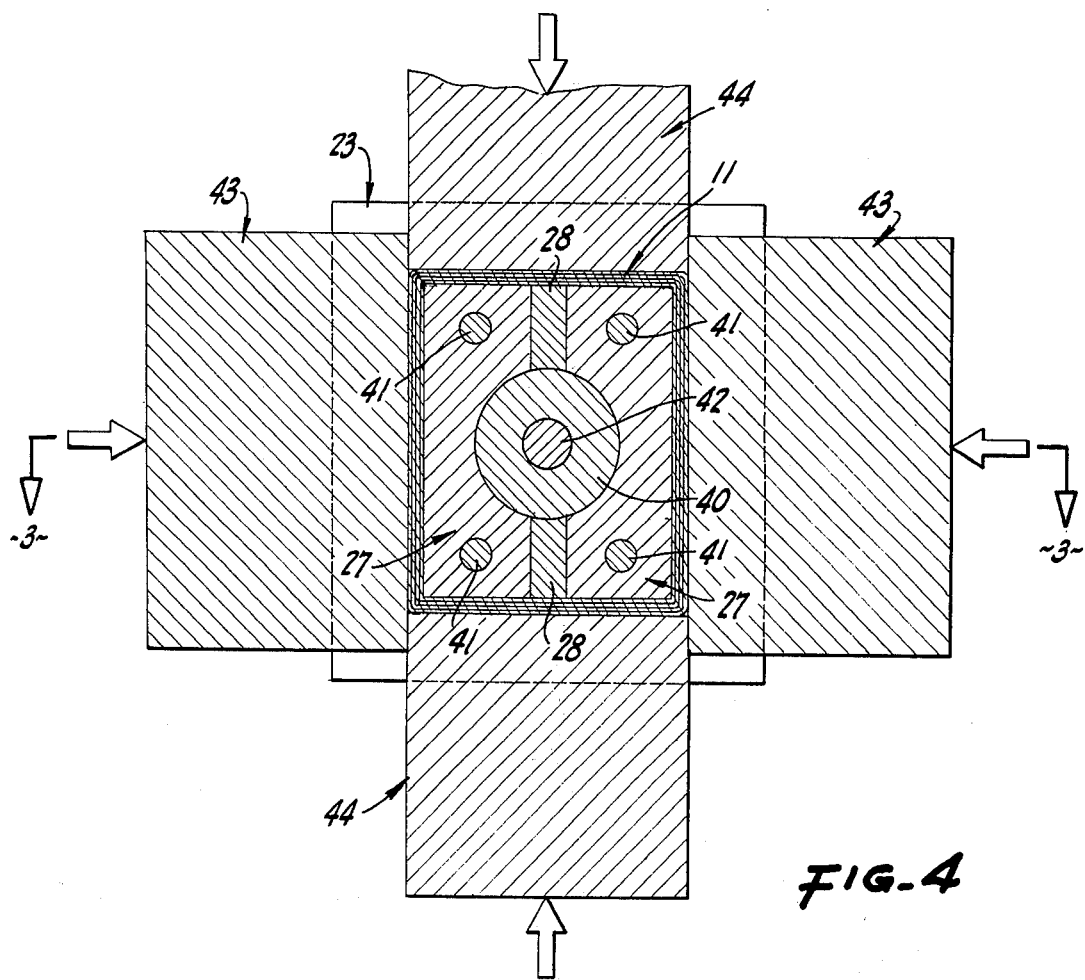
FIG. 4 is an end elevational view of the final forming assembly taken along the line 4—4 of FIG. 3.
Figure 5:
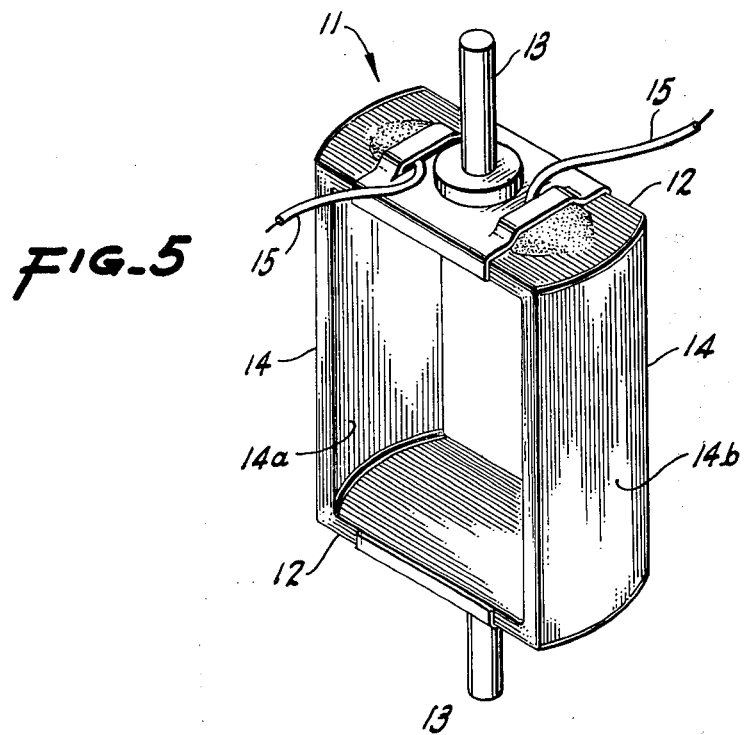
FIG. 5 is an isometric view of a finished contour molded coil.

The contour molded coil of the present invention generally consists of a single continuous strand of electrical conductor wound as a coil as shown in FIG. 5. The coil is generally formed with top and bottom end turns 12 which in this configuration are flat. Pivots 13 are mounted on the end turns which provide an axis of rotation for the coil. Coil sides 14 complete the loop described by the coil and in section are shaped like a section of wall of a thin walled circular cylinder. There is a first inside radius of curvature 14a and a second outside radius of curvature 14b on the circular cylindrical shell-like sides of the coil which are substantially identical for both the right and left sides. End connections 15 are brought out from the body of the coil 11 for each continuous strand of insulated electrical conductor.

Referring now to FIGS. 1 through 4, the apparatus for winding and initial formings 16 is shown in detail and includes a collet 17 having a threaded axial hole 18 at one end and adapted at the other end to mount on a winding machine driving shaft 19. Abutting the collet 17 is a first pressure plate 21 of a rigid material such as metal and having a centrally located clearance hole 22 aligned with the cylindrical axis of the collet 17.

Abutting the first presure plat 21 is a first planar coil width form 23 which is fabricated of a suitable material, such as teflon which resists adhesion by the impregnation compound. The first coil width form 23 has a rectangular array of holes 24 in this embodiment centrally located about a larger hole 25 with its center aligned with the clearance hole 22 in the first pressure plate 21.

A split coil form 26 is comprised of two identically shaped coil form halves 27 and two spacers 28 which are also of a suitable material to which the impregnation compound will not adhere. The coil form halves 27 have two holes 31 each of the same diameter as the holes 24 in the first coil width form 23, and a radius 32 centered on one of the long sides with the same radius as the hole 25 in the coil width form 23. The other long side of the coil form half 27 has the convex face 33 of a right circular cylinder with its center on the vertical axis of symmetry of the split coil form assembly 26 as depicted in FIG. 1. The spacers 28 are placed between the coil form halves 27 so as to clear the radii 32 thus presenting a rectangular array of four holes 31 and a center aperture bounded by the radii 32 substantially similar to the array in the first coil width form 23. The split coil form assembly 26 is mounted adjacent to the first coil width form 23.

A second planar coil width form 34 of a material resisting adhesion by the impregnation compound has an array of four holes 35 and a larger centrally located hole 36 substantially in the same array as holes 24 and 25 on this first coil width form 23. The second coil width form 34 abuts the split coil form assembly 26.

A second metallic pressure plate 37 has a centrally located hole 38 aligned with the centrally located hole 22 in the first pressure plate 21. The second pressure plate 37 contacts the side of the second coil width form 34 which is opposite the side contacting the split coil form assembly 26.

A hollow metallic cylindrical locating pin 40 is inserted in the centrally located holes 25 and 36 in the first and second coil width forms 23 and 34 and through the aperature formed by the radii 32 in the split coil form assembly 26 to provide linear alignment between the last names parts 23, 26, and 34. Solid metallic cylindrical locating pins 41 are inserted through the matching arrays of holes 24, 31, and 35 to provide rotational alignment between the first and second coil width forms 23 and 34 and the split coil form assembly 26. A threaded shaft 42 is inserted through the hole 38 in the second pressure plate 37, through the axial hole in the hollow cylindrical locating pin 40, through the centrally located clearance hole 22 in the first pressure plate 21, and into the threaded hole 18 in the collet 17, thus securing the component parts of the winding and initial forming assembly 16 together.

Final forming members are placed on the winding and initial forming assembly 16 after the coil has been wound thereon to shape the external surfaces of the coil 11. These components consist of a right and a left coil side form 43 which are substantially identical in shape, and a top and a bottom end turn block 44 which are also substantially identical in shape. Both of the coil side forms and the end turn blocks are fabricated of some material resisting adhesion by the impregnation compound such as teflon. The coil side forms 43 have a land 45 extending from one side with a concave face 45 of a right circular cylinder with its center on the cylindrical axis of the cylindrical section forming the split coil form 26 when it is assembled as hereinafter described. The height of the land 45 as measured from a shoulder 46 on the coild side forms 43 is designed to provide the desired thickness of the coil sides when the shoulder 46 is seated against the sides of the first and second coil width forms 23 and 34. Relief 46a is provided at the junction of the shoulders 46 and the sides of the lands 45 to allow the shoulders 46 to seat firmly without obstruction.

The end turn blocks 44 also have lands 48 on one end which have a flat face. There are shoulders 51 from which the height of the lands 48 are measured and which when seated against the two remaining sides of the first and second width forms 23 and 43 provide the desired thickness of the coil top and bottom end turns 12.

The method involved in the invention disclosed herein includes applying uncured impregnation compound such as a suitable epoxy cement to an electrical conductor strand 52 and subsequently winding it on the coil form assembly 26 which is mounted in the winding and initial forming assembly 16. Following the winding of the conductor 52 the right and left coil side forms 43 are pressed into the winding and initial forming assembly 16 from the sides locating the convex surfaces 33 of the split coil form assembly 26 until the shoulders 46 seat firmly on the side of the first and second coil width forms 23 and 34. The top and bottom end turn block 44 are then pressed into the sides of the winding and initial forming assembly 16 from the sides locating the flat ends of the split coil form assembly 26 until the shoulders 51 seat firmly against the remaining sides of the first and second coil width forms 23 and 34. During the process of inserting the coil side forms 43 and the end turn blocks 44 excess impregnation compound will be exuded from the assembly. Subsequent to the removal of the excess impregnation compound the entire assembly is subjected to the curing cycle recommended for the impregnation compound used.

Upon completion of the cure cycle the coil side form 43 and the end turn block 44 are removed and the threaded shaft 42 is also removed. The first and second pressure plates 37 and 21 are separated as are the first and second coil width forms 23 and 34, the hollow locating pin 40, and the four solid locating pins 41. These two spacers 28 are pushed out from the side of the split coil form assembly 26 allowing that two form coil halves 27 to collapse toward the center of the coil 11 carried thereon so that they may be removed.

As shown in FIG. 5 the finished coil form has pivots 13 which define the axis of rotation of the coil and which are attached to the top and bottom end turns 12.

The axis of rotation described by the center line through the pivots 13 must be substantially the same as the mean radius of curvature of the circular cylindrical sections forming the coil sides 14. Cured impregnation compound fills the spaces between the turns of conducting wire in the finished coil 11 and presents a smooth surface on the final formed and cured coil assembly 11. The impregnation compound also provides rigidity which is further enhanced by the cylindrical section shape of the coil side 14 and affords resistance to torsional distortion due to motion of the coil mass which in service may reach rotational frequencies well over 100 Hz.

Figure 6:
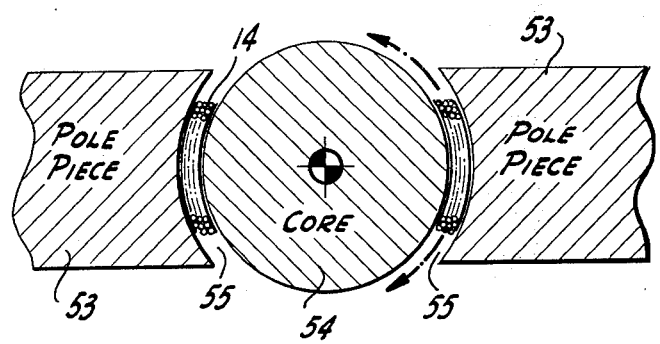
FIG. 6 is a diagramatic view of the contour molded coil in position in a galvo-motor circuit.

The contour molded coil 11 is used in conjunction with galvanometer motors which in turn are used to drive low enertia devices such as a strip chart recorder pen or a mirror in a recorder using radiant energy as a means of creating a record. As best seen in FIG. 6 a magnetic circuit is constructed consisting of pole pieces 53, a magnetic core 54, air gaps 55 between the pole pieces 53 and the core 54, and a magnetic return path between the pole pieces (not shown). The flux density in the magnetic circuit is inversely proportional to the reluctance of the circuit and the reluctance in turn rises as the width of the air gap 55 increases. The absence of a coil form, because of the rigidity of the contour molded coil 11, and the cylindrical shell section shape of the coil sides 14 allow the air gap 55 to be decreased while still affording freedom of motion within the air gap 55 for the coil sides 14 as they move about the axis of rotation on the pivots 13.

It can been seen that the contour molded coil represents a significant improvement in coil fabrication technology. The electrical conductor becomes an intergral part of the entire structure. It is precision molded into a physical configuration which allows minimum air gap in the galvo-motor. The cylindrical section imparted to the contour of the coil by the mold enhances coil rigidity and coupled with the low mass of the coil due to the absence of the conventional coil form, provides unusual resistance to torsional deformation during high frequency applications. The three essential design criteria of low coil mass, high coil rigidity, and optimum coil shape are achieved without conflict or compromise.

I claim:

1. Apparatus for winding and initial forming of galvo-motor coils comprising a collet adapted on one end to mount on a driving shaft extending from a coil winding machine and having engageable means on the opposite end, a first pressure plate aligned with the collet and butting against the collet, a first planar coil width form of a material resisting adhesion by coil impregnation compounds aligned with the first pressure plate and abutting said plate, a center section of a frustum of a cylinder which provides the initial coil form upon which the coil is wound abutting the first coil width form and of a similar material, a second planar coil width form of a material similar to the first coil and abutting the coil winding form, locating means passing through each of the first and second planar coil width forms and the coil winding form, a second pressure plate aligned with the first pressure plate and abutting the second coil width form, shaft means extending through the first and second pressure plates and interposed center section and connected to said engaging means in the collet to thereby interconnect the first and second pressure plates, first and second coil width forms, and the coil winding form together as a unitary structure.

2. Apparatus for winding and initial forming of galvo-motor coils comprising a collet adapted on one end to mount on a driving shaft extending from a coil winding machine and having a threaded hole on the opposite end, a first pressure plate having a centrally located hole aligned with the threaded hole in the collet and butting against the threaded end of the collet, a first planar coil width form of a material resisting adhesion by coil impregnation compounds, and having an array of holes located about a center hole aligned with the hole centrally located in the first pressure plate and abutting said plate, a center section of a frustum of a cylinder which provides the initial coil form upon which the coil is wound having an array of holes about a central hole matching the pattern on and abutting the first coil width form and of a similar material, a second planar coil width form of a material similar to the first coil width form having a pattern of holes matching the pattern in the first coil width form and abutting the coil winding form, locating pins passing through each of the holes in the arrays of holes in the first and second planar coil width forms and the coil winding form, a hollow cylindrical locating pin passing through the central hole in the coil winding form and the first and second coil width forms, a second pressure plate having a centrally located hole aligned with the hole in the first pressure plate and abutting the second coil width form, a threaded shaft extending through the aligned central holes of the first and second pressure plates and the hollow cylindrical locating pin and engaging the threads in the collet, whereby the first and second pressure plates, first and second coil width forms, and the coil winding form are secured together.

3. An apparatus for winding and initial forming of galvo-motor coils as in claim 1 together with means for final forming of the exterior surfaces of the end turns and two coil sides comprising of a top and bottom end turn block of a material resisting adhesion by the impregnation compound and presenting the desired surface for pivot mounting to the exterior of the coil end turns, a pair of left coil side forms made of a material resisting adhesion by the impregnation compound and presenting a concave cylindrical surface to the exterior of the coil sides with a constant radius of curvature from the center line of the cylindrical section comprising the coil winding form, said end turn blocks and coil side forms having shoulders dimensioned to produce the desired coil thickness when seated on the first and second planar coil width forms, thereby forming the coil in its desired final shape and causing excess impregnation compound to be exuded from the assembly.

4. Apparatus as in claim 1 in which said coil winding center form is split along a line of symmetry parallel with the axis of the cylindrical frustum, a top and bottom spacer of a material resisting adhesion by the impregnation compound, whereby the spacers may be removed after the impregnation compound curing cycle, and the coil form may be collapsed toward the volume vacated by the spacers to facilitate removal of the coil form after it has been cured in its final shape.

5. A method of forming a galvo-motor coil comprising providing a coil winding form in the shape of the most efficient magnetic gap configuration for a rotating component, coating an insulated strand of an electrical conductor with a conductor winding impregnation compound, winding the coated electrical conductor on the coil winding form, applying shaped external forming members to the end turns and the coil sides to cause the coil to conform to the shape of said coil winding and forming members, curing the impregnation compound with the coil in the forming assembly, and removing the coil from the forming assembly by non-destructive disassembly of the forming assembly, thereby affording a low-mass, high rigidity, self-supporting coil.

* * * * *